United States Patent
Song et al.

(10) Patent No.: US 9,605,968 B2
(45) Date of Patent: Mar. 28, 2017

(54) NAVIGATION ROUTE COOPERATION NAVIGATION SYSTEM AND METHOD OF CONTROLLING THE SAME

(71) Applicant: Electronics and Telecommunications Research Institute, Daejeon (KR)

(72) Inventors: Yoo Seung Song, Daejeon (KR); Hyun Jeong Yun, Daejeon (KR); Oh Cheon Kwon, Daejeon (KR); Joo Chan Sohn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 7 days.

(21) Appl. No.: 14/737,238

(22) Filed: Jun. 11, 2015

(65) Prior Publication Data

US 2016/0146619 A1  May 26, 2016

(30) Foreign Application Priority Data

Nov. 26, 2014 (KR) .................. 10-2014-0166538

(51) Int. Cl.
  *G01C 21/34* (2006.01)
  *H04L 29/08* (2006.01)
  *B60K 35/00* (2006.01)

(52) U.S. Cl.
  CPC .............. *G01C 21/34* (2013.01); *B60K 35/00* (2013.01); *G01C 21/3438* (2013.01); *H04L 67/12* (2013.01)

(58) Field of Classification Search
  CPC .......... G01C 21/34; B60K 35/00; H04L 67/12
  USPC ..................................... 701/23–28, 400, 537
  See application file for complete search history.

(56) References Cited

U.S. PATENT DOCUMENTS

| 5,428,544 | A  | * | 6/1995  | Shyu .............. G01C 21/3492 340/902 |
| 6,163,750 | A  | * | 12/2000 | Nojima ............ G01C 21/3629 340/988 |
| 6,188,957 | B1 | * | 2/2001  | Bechtolsheim ........ G01C 21/32 340/903 |
| 6,445,308 | B1 | * | 9/2002  | Koike .................. G01S 5/0072 180/167 |
| 6,868,333 | B2 | * | 3/2005  | Melen .................. G01C 21/26 701/482 |

(Continued)

FOREIGN PATENT DOCUMENTS

| JP | 2014013153 A   | 1/2014 |
| KR | 1020040000947 A | 1/2004 |
| KR | 100957137 B1   | 5/2010 |

OTHER PUBLICATIONS

Otto Baijer, GCDC Interaction Protocol, Jun. 18, 2012.

*Primary Examiner* — Tyler J Lee
(74) *Attorney, Agent, or Firm* — William Park & Associates Ltd.

(57) ABSTRACT

A navigation route cooperation navigation system and a method of controlling the same are provided. The navigation route cooperation navigation system can secure a visible distance or a communicable range and allow a member vehicle which cannot perform cluster driving to drive according to driving information of a leader vehicle, allow the member vehicle to drive according to a recommended route better than a navigation route of a leader vehicle, and set the member vehicle which passes the leader vehicle as a new leader vehicle.

17 Claims, 3 Drawing Sheets

(56) References Cited

U.S. PATENT DOCUMENTS

| | | | | |
|---|---|---|---|---|
| 7,292,935 B2* | 11/2007 | Yoon | G01C 21/3438 | 340/988 |
| 7,363,117 B2* | 4/2008 | Tengler | G01C 21/26 | 340/903 |
| 7,772,996 B2* | 8/2010 | Burns | G08G 1/164 | 340/988 |
| 8,126,642 B2* | 2/2012 | Trepagnier | G01S 17/023 | 180/167 |
| 8,269,652 B2* | 9/2012 | Seder | G01S 13/723 | 340/435 |
| 8,307,037 B2* | 11/2012 | Bain | G01C 21/26 | 705/319 |
| 8,362,924 B2 | 1/2013 | Kim et al. | | |
| 9,274,785 B2* | 3/2016 | Jung | G06F 8/65 | |
| 2003/0009271 A1* | 1/2003 | Akiyama | G06F 21/335 | 701/29.6 |
| 2010/0106356 A1* | 4/2010 | Trepagnier | G01S 17/023 | 701/25 |
| 2011/0118967 A1* | 5/2011 | Tsuda | B60W 30/10 | 701/117 |
| 2011/0276220 A1* | 11/2011 | Sato | G08G 1/22 | 701/31.4 |
| 2013/0080345 A1* | 3/2013 | Rassi | G06Q 50/01 | 705/319 |
| 2013/0082874 A1* | 4/2013 | Zhang | G01S 5/0072 | 342/357.31 |
| 2014/0074387 A1 | 3/2014 | Lee et al. | | |
| 2014/0302774 A1* | 10/2014 | Burke | H04H 20/57 | 455/3.05 |
| 2015/0081157 A1* | 3/2015 | Banasky, Jr. | G01C 21/26 | 701/29.1 |
| 2015/0220321 A1* | 8/2015 | Jung | H04L 67/12 | 717/169 |
| 2016/0026182 A1* | 1/2016 | Boroditsky | H04L 67/306 | 701/23 |

* cited by examiner

NAVIGATION ROUTE COOPERATION NAVIGATION SYSTEM AND METHOD OF CONTROLLING THE SAME

CROSS-REFERENCE TO RELATED APPLICATION

This application claims priority to and the benefit of Korean Patent Application No. 10-2014-0166538, filed on Nov. 26, 2014, the disclosure of which is incorporated herein by reference in its entirety.

BACKGROUND

1. Field of the Invention

The present invention relates to a navigation route cooperation navigation system and a method of controlling the same, and more particularly, to a system and method capable of smoothly performing cooperative cluster driving by mutual cooperation of mobile objects.

2. Discussion of Related Art

Generally, cooperative cluster driving technology has features in which a plurality of vehicles maintain a predetermined safety distance, perform cluster driving, and share (periodically exchange) vehicle driving information while driving into clusters and cooperating with each other.

One among the plurality of vehicles performing the cooperative cluster driving described above drives as a leader vehicle, and remaining vehicles excluding the leader vehicle drive as member vehicles.

A terminal located in the leader vehicle transmits its own vehicle driving information to the member vehicles, and terminals located in the member vehicles provide a navigation service according to the driving information received from the leader vehicle so that their own vehicles maintain the same speed, direction, etc. as the leader vehicle.

In the cooperative cluster driving technology, the driving information of the leader vehicle should be exactly transmitted to the member vehicles with a delay time and a cycle within several tens of ms.

Accordingly, the plurality of vehicles performing the cooperative cluster driving should maintain a predetermined distance (a visible distance or a communicable range, etc.) from each other.

However, the cooperative cluster driving technology has a problem in which communication failure occurs when distances between the plurality of vehicles performing the cooperative cluster driving are far above the predetermined distance (the visible distance by a driver, or the communicable range), or another external vehicle comes between the plurality of vehicles, and there are no solutions in this situation.

Further, the cooperative cluster driving technology has a problem in which a preceding vehicle cannot recommend an optimum route instead of its own driving route to a trailing vehicle when its own driving route is not the optimum route, and the trailing vehicle which is being driven ahead of the preceding vehicle cannot be set as the preceding vehicle.

SUMMARY OF THE INVENTION

The present invention is directed to a navigation route cooperation navigation system in which a visible distance to a driver or a range of communication with a wireless communication module can be secured, and a member vehicle which cannot perform a cluster driving can also drive according to driving information of a leader vehicle, and a method of controlling the same.

Further, the present invention is directed to a navigation route cooperation navigation system in which a member vehicle can drive according to a recommended route better than that of a leader vehicle, and a method of controlling the same.

Moreover, the present invention is directed to a navigation route cooperation navigation system in which a member vehicle which is being driven ahead of a leader vehicle can perform a function of a new leader vehicle, and a method of controlling the same.

According to one aspect of the present invention, there is provided a navigation system, including: a server configured to manage uploaded driving related information and navigation route information, and allow the driving related information and the navigation route information to be downloaded; and a vehicle terminal installed in each of one leader vehicle and at least one member vehicle, when the vehicle terminal is installed in the leader vehicle, configured to upload obtained driving related information and its own navigation route information to the server and transmit the uploaded information to the at least one member vehicle, and when the vehicle terminal is installed in the at least one member vehicle, configured to provide a navigation service according to the driving related information and the navigation route information downloaded from the server by requesting the uploaded information to the server, or received from the leader vehicle.

The driving related information may include sensor information obtained from sensors installed in each vehicle and additional driving information of each vehicle, the sensor information may include at least one among a speed, a direction, lane-changing, a vision of each vehicle, and the additional driving information may include motion information of each vehicle, and information in which a specific image or a warning display through the vision is processed as a traffic event.

When the vehicle terminal is installed in the leader vehicle, the vehicle terminal may upload a recommended route to the server when the recommended route having a distance or a time shorter than its own navigation route is searched for.

When the vehicle terminal is installed in the at least one member vehicle, the vehicle terminal may download the driving related information and the navigation route information from the server when a service mode which is set is a navigation route navigation mode, and receive the driving related information and the navigation route information from the leader vehicle when the service mode is a real-time cooperative driving mode.

When the service mode is the navigation route navigation mode, the vehicle terminal may upload the obtained driving related information and its own navigation route information to the server, and when a recommended route having a shorter distance or time than its own navigation route is searched for, upload the retrieved recommended route to the server.

When the recommended route is downloaded from the server, the vehicle terminal may provide the navigation service according to the recommended route downloaded from the server.

The vehicle terminal may include: a wireless communication module configured to upload the driving related information and the navigation route information to the server, transmit the driving related information and the navigation route information to the at least one member vehicle, and transmit the driving related information and the navigation route information downloaded from the server or received from the leader vehicle; and a processing module configured to transmit the obtained driving related information and its own navigation route information to the wireless communication module, or provide the navigation service according to the driving related information and the navigation route information transmitted from the wireless communication module.

When the processing module is installed in the vehicle terminal of the leader vehicle, the processing module may transmit the driving related information and its navigation route information to the wireless communication module so that the driving related information and its own navigation route information is uploaded to the server, and when a recommended route having a shorter distance or time than its own navigation route is searched for, transmit the recommended route to the wireless communication module so that the recommended route is uploaded to the server.

When the wireless communication module is installed in the vehicle terminal of the at least one member vehicle, the wireless communication module may transmit the driving related information and the navigation route information downloaded from the server to the processing module when the service mode which is set is a navigation route navigation mode, and transmit the driving related information and the navigation route information received from the leader vehicle to the processing module when the service mode in a real-time cooperative driving mode.

According to another aspect of the present invention, there is provided a navigation control method, including: setting a cluster driving mode on its own vehicle as one of a leader driving mode and a member driving mode; uploading driving related information and navigation route information on its own vehicle to a server when the cluster driving mode is the leader driving mode, and transmitting the driving related information and the navigation route information to a vehicle in which the cluster driving mode is the member driving mode; and providing a navigation service to its own vehicle according to the driving related information and the navigation route information downloaded from the server by requesting the uploaded information to the server or received from a vehicle in which the cluster driving mode is the leader driving mode when the cluster driving mode is the member driving mode.

The driving related information may include sensor information obtained from sensors installed in each vehicle and additional driving information of each vehicle, the sensor information may include at least one among a speed, a direction, lane-changing, a vision of each vehicle, and the additional driving information may include motion information of each vehicle, and information in which a specific image or a warning display through the vision is processed as a traffic event.

The transmitting of the driving related information and navigation route information to the vehicle in which the cluster driving mode is the member driving mode may include: uploading a retrieved recommended route to the server when the recommended route having a shorter distance or time than its own navigation route is searched for.

The providing of the navigation service to its own vehicle may include: downloading the driving related information and the navigation route information from the server when a service mode which is set is a navigation route navigation mode; and receiving the driving related information and the navigation route information from a vehicle in which the cluster driving mode is the leader driving mode when the service mode is a real-time cooperative driving mode.

The downloading of the driving related information and the navigation route information from the server may include: uploading the driving related information and the navigation route information on its own vehicle to the server; and uploading a retrieved commended route to the server when the recommended route having a shorter distance or time than its own navigation route is searched for.

The downloading of the driving related information and the navigation route information from the server may further include: providing the navigation service according to the recommended route downloaded from the server when the recommended route is downloaded from the server.

According to still another aspect of the present invention, there is provided a vehicle terminal, wherein the vehicle terminal is installed in each of one leader vehicle and at least one member vehicle, and provides a navigation service so that each vehicle performs navigation route cooperative cluster driving, including: a wireless communication module configured to upload driving related information and navigation route information to the server, transmit the driving related information and the navigation route information to the at least one member vehicle, or transmit the driving related information and the navigation route information downloaded from the server or received from the leader vehicle; and a processing module configured to transmit the driving related information and its own navigation route information to the wireless communication module, or provide the navigation service according to the driving related information and the navigation route information transmitted from the wireless communication module.

When the processing module is installed in the vehicle terminal of the leader vehicle, the processing module may transmit the driving related information and its own navigation route information to the wireless communication module so that the driving related information and its navigation route information is uploaded to the server, and when a recommended route having a shorter distance or time than its own navigation route is searched for, transmit the recommended route to the wireless communication module so that the recommended route is uploaded to the server.

When the wireless communication module is installed in the vehicle terminal of the at least one member vehicle, the wireless communication module may transmit the driving related information and the navigation route information downloaded from the server to the processing module when a service mode which is set is the navigation route navigation mode, and transmit the driving related information and the navigation route information received from the leader vehicle to the processing module when the service mode in a real-time cooperative driving mode.

When the processing module is installed in the vehicle terminal of the at least one member vehicle, the processing module may transmit the obtained driving related information and its own navigation route information to the wireless communication module so that the obtained driving related information and its own navigation route information is uploaded to the server, and transmit a retrieved recommended route to the wireless communication module so that the recommended route having a shorter distance or time than its own navigation route is searched for.

The processing module may provide the navigation service according to the recommended route when the recommended route is downloaded from the server through the wireless communication module.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, exemplary embodiments of the present invention will be described in detail below with reference to the accompanying drawings. However, the present invention is not limited to exemplary embodiments which will be described hereinafter, and can be implemented by various different types. Exemplary embodiments of the present invention are described below in sufficient detail to enable those of ordinary skill in the art to embody and practice the present invention. The present invention is defined by claims. Meanwhile, the terminology used herein to describe exemplary embodiments of the invention is not intended to limit the scope of the invention. The articles "a," "an," and "the" are singular in that they have a single referent, however the use of the singular form in the present document should not preclude the presence of more than one referent. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Figure 1:
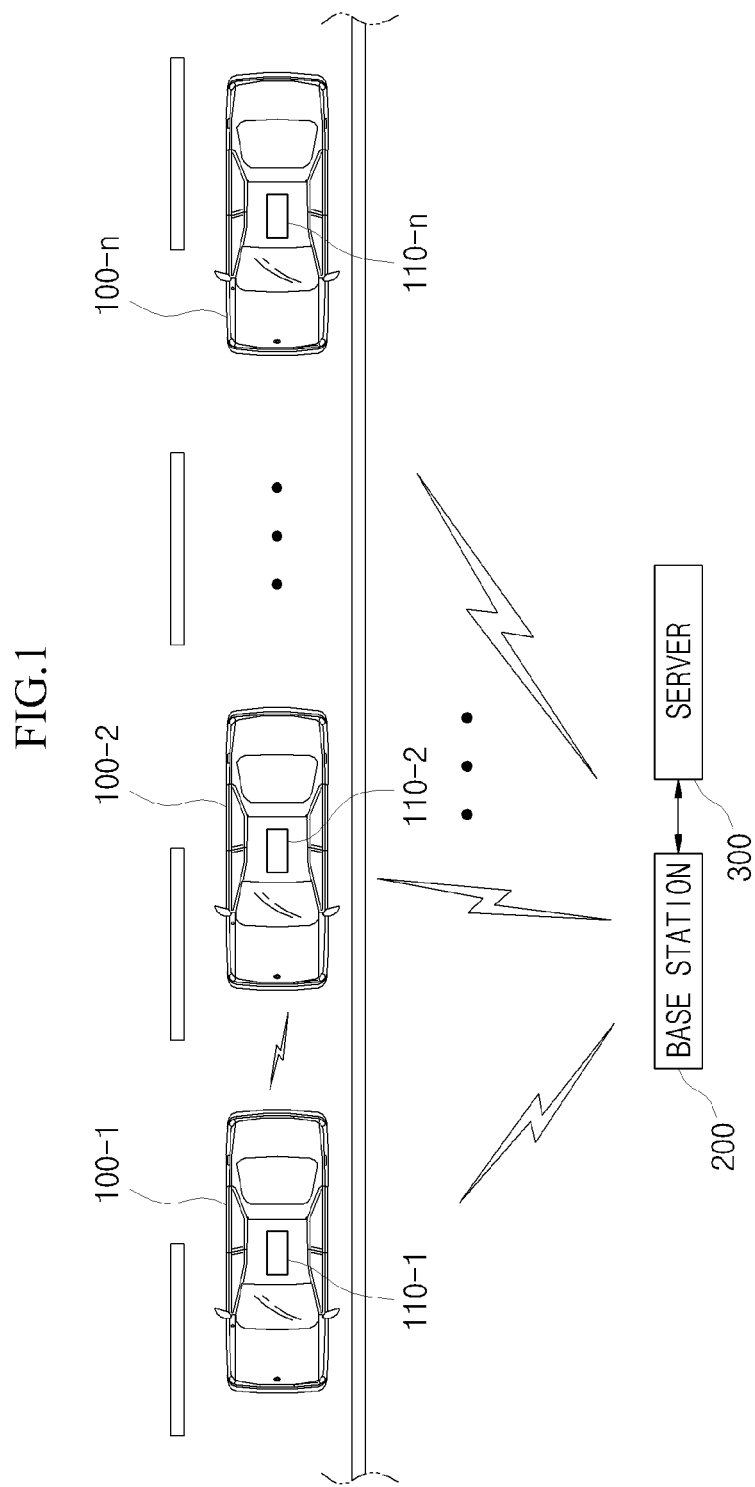
FIG. 1 is a diagram illustrating a network connection of a navigation route cooperation navigation system according to an embodiment of the present invention.

Hereinafter, a navigation route cooperation navigation system according to an embodiment of the present invention will be described with reference to FIG. 1. The navigation route cooperation navigation system according to an embodiment of the present invention may be applied to mobile objects such as a pedestrian, a vehicle, an airplane, a ship, etc., and hereinafter, an example in which the mobile object is the vehicle will be described. FIG. 1 is a diagram illustrating a network connection of a navigation route cooperation navigation system according to an embodiment of the present invention.

As shown in FIG. 1, the navigation route cooperation navigation system may include n vehicle terminals 110-1 to 110-n, a base station 200, and a server 300.

The vehicle terminals 110-1 to 110-n may be installed in vehicles 100-1 to 100-n, respectively, and each of the vehicle terminals 110-1 to 110-n may provide a navigation service so that each of the vehicles 100-1 to 100-n performs navigation route cooperation cluster driving.

For example, each of the vehicle terminals 110-1 to 110-n may include its own driving route information in driving related information on its own vehicle which is obtained, transmit the information to a trailing vehicle every predetermined period according to a predetermined wireless communication method, and upload the transmitted information to the server 300 through the base station 200.

Here, the driving related information may include sensor information sensed by sensors installed in each of the vehicles 100-1 to 100-n, additional driving information of each of the vehicles 100-1 to 100-n, etc., the sensor information may include a speed, a direction, a lane-change, a vision, etc., and the additional driving information may include information in which an abrupt motion of a vehicle, a specific image or a warning display through the version, etc. are processed as a traffic event.

Further, the predetermined wireless communication method may be a local area wireless communication method, and every local area wireless communication method may be used.

Each of the vehicle terminals 110-1 to 110-n may receive driving related information from the vehicles in front of its own vehicle, or request the driving related information which the server 300 manages from the server 300 and download it from the server. Each of the vehicle terminals 110-1 to 110-n may provide a navigation service to its own vehicle according to the driving related information received from the vehicle in front of its own vehicle or downloaded from the server 300.

The base station 200 may be all types of access points (AP) connected to a mobile communication base station or an infrastructure, and transmit the driving related information transmitted from each of the vehicle terminals 110-1 to 110-n to the server 300.

The server 300 may manage the driving related information transmitted from the base station 200 using a look-up table, obtain the driving related information corresponding to a request of each of the vehicle terminals 110-1 to 110-n among the driving related information managed using the look-up table when the driving related information is requested by each of the vehicle terminals 110-1 to 110-n, and download the obtained driving related information to each of the vehicle terminals 110-1 to 110-n.

For example, the server 300 may store using the look-up table by corresponding the driving related information uploaded from each of the vehicle terminals 110-1 to 110-n to an uploaded time and location information included in navigation route information of each of the vehicles 100-1 to 100-n.

The server 300 may obtain the driving related information corresponding to each of the vehicle terminals 110-1 to 110-n in the look-up table according to a time in which the driving related information is requested and the location information of each of the vehicle terminals 110-1 to 110-n when the driving related information is requested by each of the vehicle terminals 110-1 to 110-n, and download the obtained driving related information to each of the vehicle terminals 110-1 to 110-n.

Hereinafter, an operation of each of the vehicle terminals 110-1 to 110-n according to whether a vehicle in which each of the vehicle terminal 110-1 to 110-n is installed is a leader vehicle or a member vehicle will be described, and when the vehicle in which each of the vehicle terminals 110-1 to 110-n is installed is the member vehicle, an operation of each of the vehicle terminals 110-1 to 110-n according to whether a service mode is a navigation route driving mode or a real-time cooperative driving mode will be described.

First, before n vehicles 100-1 to 100-n performs cooperative cluster driving, whether to drive as the leader vehicle or the member vehicle may be set by a driver through an interface module of each of the vehicle terminals 110-1 to 110-*n*.

Further, the vehicle set to be driven as the member vehicle may be set again as one of the real-time cooperative driving mode and the navigation route navigation mode which are the service modes by the driver through the interface module of each of the vehicle terminals 110-1 to 110-*n*.

For example, the driver of the vehicle set to be driven as the member vehicle (hereinafter, it may be referred to as 'member vehicle') may set the service mode as the real-time cooperative driving mode through the interface module of each of the vehicle terminals 110-1 to 110-*n* when its own vehicle is located within the visible distance from the leader vehicle. However, when its own vehicle is not located within the visible distance from the leader vehicle, the driver of the member vehicle may set the service mode as the navigation route navigation mode through the interface module of each of the vehicle terminals 110-1 to 110-*n*.

Meanwhile, the service mode of the member vehicle may be set by each of the vehicle terminals 110-1 to 110-*n*.

That is, each of the vehicle terminals 110-1 to 110-*n* of the member vehicles may determine whether its own vehicle is located within a range of communication with the leader vehicle, and set the service mode according to the determination result.

For example, each of the vehicle terminals 110-1 to 110-*n* of the member vehicles may determine that its own vehicle is not located within the range of communication with the leader vehicle when the driving related information transmitted by the vehicle terminal of the leader vehicle is not received, and determine that its own vehicle is located within the range of communication with the leader vehicle when the driving related information transmitted by the vehicle terminal of the leader vehicle is received.

Accordingly, when each of the vehicle terminals 110-1 to 110-*n* of the member vehicles determines that its own vehicle is not located within the communicable range of the leader vehicle, it may set the service mode as the navigation route navigation mode, and when each of the vehicle terminals 110-1 to 110-*n* of the member vehicles determines that its own vehicle is located within the range of communication with the leader vehicle, it may set the service mode as the real-time cooperative driving mode.

Hereinafter, an operation of each of the vehicles 100-1 to 100-*n* will be described by assuming that the vehicle 100-1 is the leader vehicle and the vehicles 100-2 to 100-*n* are the member vehicles.

The vehicle terminal 110-1 of the leader vehicle 100-1 may obtain the driving related information on its own vehicle when its own vehicle 100-1 is driven according to a navigation route provided by a navigation service, transmit information including its own navigation route information to the driving related information on its own vehicle to the vehicle terminals 110-2 to 110-*n* of the member vehicles 100-2 to 100-*n*, and upload the transmitted information to the server 300 through the base station 200.

Further, when the vehicle terminal 110-1 of the leader vehicle 100-1 uploads the driving related information on its own vehicle to the server 300, the vehicle terminal 110-1 of the leader vehicle 100-1 may upload information including recommended route information to the driving related information on its own vehicle to the server 300 when there is the recommended route (the shortest time, the shortest distance, etc.) better than its own navigation route.

For example, when the vehicle terminal 110-1 of the leader vehicle 100-1 is faced with congestion due to unexpected accidents or construction, etc. while its own vehicle 100-1 is driven according to the navigation route provided by the navigation service, the vehicle terminal 110-1 may search for a new route to the destination, and upload information including the retrieved new route in the driving related information as the recommended route to the server 300.

That is, when its own driving speed is slower than a specified speed on the navigation route provided by the navigation service, or a new route search to the destination is manipulated by the driver, the vehicle terminal 110-1 of the leader vehicle 100-1 may search for the new route to the destination, and upload information including the retrieved new route in the driving related information as the recommended route to the server 300.

At this time, when the vehicle terminal 110-1 of the leader vehicle 100-1 is a conventional vehicle navigation device, the vehicle terminal 110-1 may transmit the driving related information on its own vehicle 100-1 through a separate communication device, and when the vehicle terminal 110-1 of the leader vehicle 100-1 is a smart terminal (a mobile phone, etc.), the vehicle terminal 110-1 may directly transmit the driving related information on its own vehicle 100-1.

Hereinafter, an operation of the member vehicle 100-*n* will be described by assuming that the service mode of the member vehicle 100-*n* is the navigation route navigation mode.

The vehicle terminal 110-*n* of the member vehicle 100-*n* may download the driving related information from the server 300, and provide the navigation service to its own vehicle 100-*n* according to the downloaded driving related information.

For example, the vehicle terminal 110-*n* of the member vehicle 100-*n* may simply provide a navigation service to its own vehicle according to the navigation route downloaded from the server 300, and when the recommended route is included in the driving related information from the server 300, provide the navigation service according to the recommended route. Further, the vehicle terminal 110-*n* of the member vehicle 100-*n* may provide the additional driving information including a warning condition, a traffic event, etc. included in the driving related information downloaded from the server 300, and also provide the sensor information included in the driving related information downloaded from the server 300 in order to support a partial or complete automatic driving mode of its own vehicle 100-*n*.

Further, the vehicle terminal 110-*n* of the member vehicle 100-*n* may download the driving related information from the server 300, and provide the navigation service, etc. to its own vehicle 100-*n*, and also upload information including its own navigation route information in the driving related information on its own vehicle 100-*n* to the server 300 through the base station 200.

Accordingly, the server 300 may also manage the driving related information uploaded from not only the vehicle terminal 110-1 of the leader vehicle 100-1 but also the vehicle terminal 110-*n* of the member vehicle 100-*n* using the look-up table. Further, the server 300 may also manage the driving related information uploaded from the vehicle terminals of other member vehicles in which the service mode is the navigation route navigation mode using the look-up table.

As described above, since the server 300 manages the driving related information on the leader vehicle 100-1 and a plurality of member vehicles in which the service mode is the navigation route navigation mode using the look-up table, the vehicle terminal 110-*n* of the member vehicle 100-*n* may request a piece of the driving related information managed using the look-up table from the server 300 and download it from the server 300.

For example, the vehicle terminal 110-*n* of the member vehicle 100-*n* may request a list of the driving related information managed using the look-up table from the server 300, download the requested list from the server 300, and display the requested list.

When one of the lists downloaded and displayed from the server 300 is selected, the vehicle terminal 110-*n* of the member vehicle 100-*n* may request the selected driving related information from the server 300, and download the requested driving related information from the server 300.

The vehicle terminal 110-*n* of the member vehicle 100-*n* may provide the navigation service to its own vehicle 100-*n* according to the driving related information downloaded from the server 300.

Accordingly, the vehicle terminal 110-*n* of the member vehicle 100-*n* may provide the navigation service, etc. to its own vehicle 100-*n* according to the latest driving related information instead of the driving related information of the leader vehicle 100-1.

Further, when there is a route (the shortest time, the shortest distance, etc.) better than a navigation route of the leader vehicle 100-1, the vehicle terminal 110-*n* of the member vehicle 100-*n* may upload information including the route in the driving related information as the recommended route to the server 300.

For example, when its own vehicle is faced with congestion due to unexpected accidents or construction, etc. while its own vehicle 100-2 is driven according to the navigation route provided by the navigation service, the vehicle terminal 110-*n* of the member vehicle 100-*n* may search for a new route to the destination, and upload information including the retrieved new route in the driving related information as the recommended route to the server 300.

That is, when a driving speed of its own vehicle 100-*n* is slower than a specified speed of the navigation route provided by the navigation service, or a new route search to the destination is manipulated by the driver, the vehicle terminal 110-*n* of the member vehicle 100-*n* may search for the new route to the destination, and upload information including the retrieved new route in the driving related information as the recommended route to the server 300.

Meanwhile, when the member vehicle 100-*n* passes the leader vehicle 100-1 by driving according to the recommended route instead of the navigation route of the leader vehicle 100-1 due to road traffic conditions, the member vehicle 100-*n* may be set as a new leader vehicle.

When its own vehicle 100-1 is driven according to the navigation route provided by the navigation service as the vehicle terminal 110-1 of the previous leader vehicle 100-1 operates, the vehicle terminal 110-*n* of the new leader vehicle 100-*n* may obtain the driving related information on its own vehicle 100-*n*.

Next, the vehicle terminal 110-*n* of the new leader vehicle 100-*n* may transmit information including its own navigation route information in the driving related information on its own vehicle 100-*n* to the vehicle terminals of the new member vehicle 100-1 and other member vehicles, and upload the transmitted information to the server 300.

Hereinafter, an operation of the member vehicle 100-2 will be described by assuming that the service mode of the member vehicle 100-2 is the real-time cooperative driving mode.

The vehicle terminal 110-2 of the member vehicle 100-2 may receive the driving related information of the leader vehicle 100-1 transmitted by the vehicle terminal 110-1 of the leader vehicle 100-1.

Next, the vehicle terminal 110-2 of the member vehicle 100-2 may provide the navigation service according to the received driving related information of the leader vehicle 100-1.

For example, the vehicle terminal 110-2 of the member vehicle 100-2 may simply provide the navigation service to its own vehicle 100-2 according to the navigation route of the leader vehicle 100-1, and provide the additional driving information including a warning condition of the leader vehicle 100-1, a traffic event, etc. The vehicle terminal 110-2 of the member vehicle 100-2 may also provide sensor information of the leader vehicle 100-1 in order to support a partial or complete automatic driving mode of its own vehicle 100-2.

Further, the vehicle terminal 110-2 of the member vehicle 100-2 may monitor a driving condition of its own vehicle 100-2 according to the received driving related information of the leader vehicle 100-1, and periodically transmit condition information of its own vehicle 100-2 to the vehicle terminal 110-1 of the leader vehicle 100-1.

Accordingly, the member vehicle 100-2 may smoothly perform cluster driving in close proximity with the leader vehicle 100-1.

Meanwhile, here, the operation of the member vehicle 100-2 and the member vehicle 100-*n* was described by assuming that the service mode of the member vehicle 100-2 is the real-time cooperative driving mode and the service mode of the member vehicle 100-*n* is the navigation route navigation mode, but is not limited thereto. Each of the member vehicles 100-2 to 100-*n* may perform the operation described above according to the set service mode.

As described above, according to the present invention, route information to the destination (the navigation service) in which the member vehicle does not experience in a cooperation mode with every vehicle may be provided by sharing the route information of the leader vehicle. Accordingly, the member vehicle may easily follow a complex navigation route of the leader vehicle or use a better recommended route, and the navigation service may be provided to the member vehicle without securing the visible distance with the leader vehicle. Further, when the member vehicle passes the leader vehicle, the member vehicle may be reset as the new leader vehicle, and the new leader vehicle can continuously provide the road condition and route information to the member vehicle. The latest information on the destination route may be previously obtained and provided so that the member mobile object (including the pedestrian) safely drives (walks).

Figure 2:
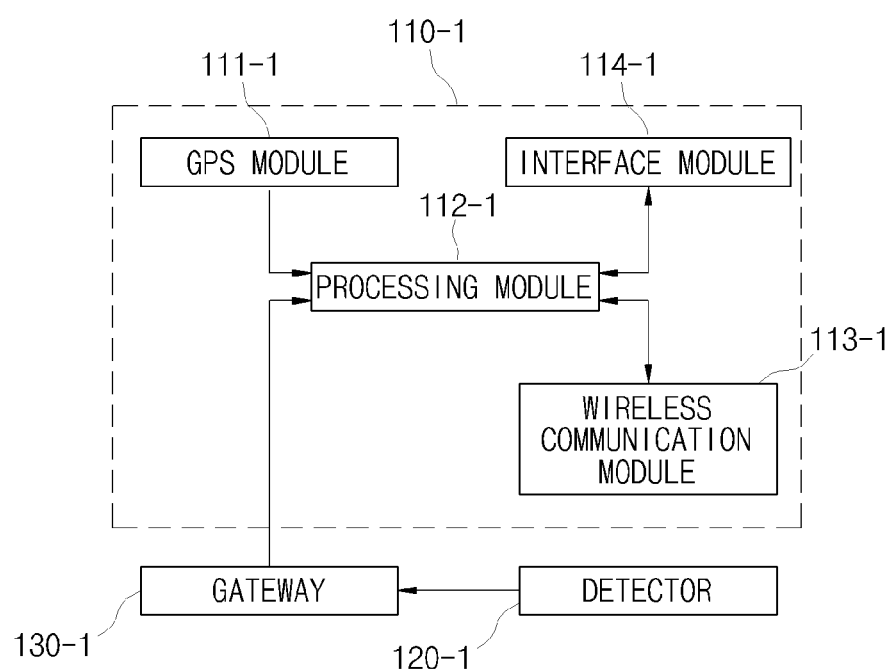
FIG. 2 is a diagram illustrating a configuration of a vehicle terminal of FIG. 1.

Meanwhile, configurations and operations of the vehicle terminals 110-1 to 110-*n* are the same, and the configuration of the vehicle terminal 110-1 of FIG. 1 will be described below in more detail with reference to FIG. 2. FIG. 2 is a diagram illustrating a configuration of a vehicle terminal of FIG. 1.

As shown in FIG. 2, the vehicle terminal 110-1 may provide a navigation service so that its own vehicle 100-1 performs cooperative cluster driving with other vehicles 100-2 to 100-*n*, and include a global positioning system (GPS) module 111-1, a processing module 112-1, a wireless communication module 113-1, and an interface module 114-1.

The GPS module 111-1 may obtain position information of its own vehicle 100-1, and transmit the obtained position information to the processing module 112-1.

Here, an example in which the GPS module 111-1 is included in the vehicle terminal 110-1 is described, but is not limited thereto, and when the GPS module 111-1 is not included in the vehicle terminal 110-1, the vehicle terminal 110-1 may be connected to an external GPS and be configured to obtain the position information, etc. of its own vehicle 100-1

When the processing module 112-1 is installed in the vehicle terminal of the leader vehicle, the processing module 112-1 may receive the sensor information sensed by a detector 120-1 of its own vehicle 100-1 through a gateway 130-1. The processing module 112-1 may obtain the driving related information in which the sensor information sensed by the detector 120-1 and the additional driving information is included, and transmit information including its own navigation route information in the obtained driving related information to the wireless communication module 113-1.

Here, the detector 120-1 may include sensors of a sensor network installed in the vehicle 100-1, and since the sensors of the sensor network installed in the vehicle 100-1 are conventional sensors, detailed description thereof will be omitted.

Further, here, an example in which the processing module 112-1 receives the sensor information from the detector 130-1 through the gateway 120-1 is described, but is not limited thereto, and the processing module 112-1 may be configured to directly receive the sensor information from the detector 120-1 without passing through the gateway 130-1.

Moreover, when the processing module 112-1 is installed in the vehicle terminal of the member vehicle, the processing module 112-1 may request the driving related information from the server 300 through the wireless communication module 113-1 when the service mode is the navigation route navigation mode, download the driving related information from the server 300, and transmit the downloaded driving related information to the interface module 114-1.

When the service mode is the real-time cooperative driving mode, the processing module 112-1 may receive the driving related information from the vehicle terminal of the leader vehicle through the wireless communication module 113-1, and transmit the received driving related information of the leader vehicle to the interface module 114-1.

When the wireless communication module 113-1 is installed in the vehicle terminal of the leader vehicle, the wireless communication module 113-1 may transmit the driving related information transmitted from the processing module 112-1 every predetermined period to the vehicle terminal of the member vehicle, and upload the transmitted driving related information to the server 300 through the base station 200.

Further, when the wireless communication module 113-1 is installed in the vehicle terminal of the member vehicle, the wireless communication module 113-1 may transmit the driving related information received from the vehicle terminal of the leader vehicle or downloaded from the server 300 to the processing module 112-1.

The interface module 114-1 may receive setting information regarding whether the vehicle 100-1 in which its own vehicle terminal 110-1 is installed is the leader vehicle or the member vehicle, and setting information regarding whether the service mode is the navigation route navigation mode or the real-time cooperative driving mode, transmit the setting information to the processing module 112-1, and provide the navigation service according to the driving related information transmitted from the processing module 112-1.

Here, each of the vehicle terminals 110-1 to 110-*n* may be a conventional navigation device, or a smart phone. Further, here, an example in which the vehicle terminal 110-1 does not include a separate detection module and the sensor information of its own vehicle 100-1 is received from the detector 120-1 installed in its own vehicle 100-1 is described, but is not limited thereto, and the separate detection module may be included in the vehicle terminal 110-1 and the sensor information of its own vehicle 100-1 may be received through the separate detection module.

Figure 3:
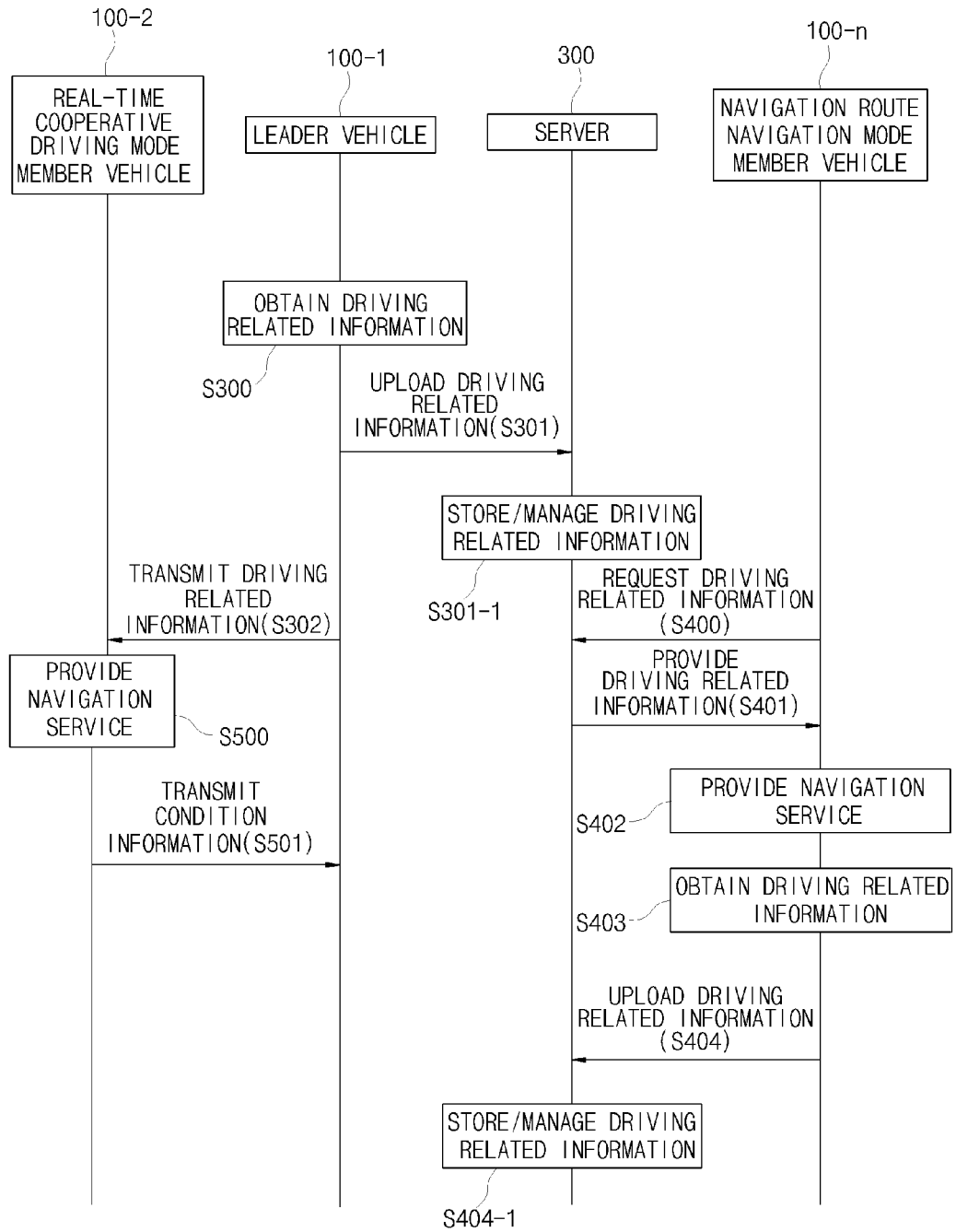
FIG. 3 is a diagram for describing a navigation control method of performing a cooperative cluster driving between vehicles according to an embodiment of the present invention.

Hereinafter, a navigation control method according to an embodiment of the present invention will be described with reference to FIG. 3. FIG. 3 is a diagram for describing a navigation control method of performing cooperative cluster driving between vehicles according to an embodiment of the present invention.

First, a vehicle to be driven may be set as the leader vehicle or the member vehicle before performing cooperative cluster driving. Further, the service mode of the vehicle set to be driven as the member vehicle may be reset as one of the real-time cooperative driving mode and the navigation route navigation mode.

For example, when the vehicle set to be driven as the member (hereinafter, it may be referred to as "member vehicle") is located within a range of communication capable of receiving the driving related information from the vehicle terminal of the leader vehicle, the service mode may be set as the real-time cooperative driving mode. However, when the member vehicle is not located within a range of communication capable of receiving the driving related information from the vehicle terminal of the leader vehicle, the service mode may be set as the navigation route navigation mode.

Accordingly, the vehicle terminal may operate according to whether its own vehicle is the leader vehicle or the member vehicle, and when the vehicle is the member vehicle, the vehicle terminal may operate according to whether the service mode of its own vehicle is the real-time cooperative driving mode or the navigation route navigation mode.

First, as shown in FIG. 3, when the vehicle terminal is installed in the leader vehicle 100-1, the vehicle terminal may obtain the driving related information including the sensor information sensed by the sensors (not shown) installed in its own vehicle 100-1 and the additional driving information (a warning condition and a traffic event, etc.) while its own vehicle 100-1 drives according to a navigation route provided by the navigation service (S300).

After this, the vehicle terminal may upload information including its own navigation route information in the obtained driving related information on its own vehicle to the server 300 (S301), and may allow the server 300 to store and manage the driving related information using the lookup table (S301-1).

Further, when there is a route (the shortest time, the shortest distance, etc.) better than its own navigation route, the vehicle terminal may upload information including the better route in the driving related information as a recommended route to the server 300.

For example, when its own vehicle 100-1 is faced with congestion due to unexpected accidents or construction, etc. while its own vehicle 100-1 drives according to the navigation route provided by the navigation service, the vehicle terminal may search for a new route to the destination, and upload information including the retrieved new route in the driving related information as the recommended route to the server 300.

That is, when its own driving speed is slower than a specified speed of the navigation route provided by the navigation service, or a new route search to the destination is manipulated by the driver, the vehicle terminal of the leader vehicle 100-1 may search for the new route to the destination, and upload information including the retrieved new route in the driving related information as the recommended route to the server 300.

Meanwhile, when the vehicle terminal is installed in the member vehicle 100-n in which the service mode is the navigation route navigation mode, the vehicle terminal may request the driving related information managed using the look-up table from the server 300 (S400), and download (receive) the driving related information managed using the look-up table from the server 300 (S401).

The vehicle terminal may provide the navigation service, etc. to its own vehicle 100-n according to the driving related information downloaded from the server 300 (S402).

For example, the vehicle terminal may simply provide the navigation service to its own vehicle 100-n according to the navigation route included in the downloaded driving related information, and provide the navigation service according to the recommended route when the recommended route is included in the downloaded driving related information. Further, the vehicle terminal may provide the additional driving information including a warning condition, a traffic event, etc. included in the downloaded driving related information, and also provide the sensor information included in the downloaded driving related information in order to support a partial or complete automatic driving mode of its own vehicle 100-n.

Further, when its own vehicle 100-n is driven according to the navigation route provided by the navigation service, the vehicle terminal may obtain the driving related information including the sensor information sensed by the sensors (not shown) installed in its own vehicle 100-n, and the additional driving information (the warning condition and the traffic event, etc.) (S403).

After this, the vehicle terminal may upload information including its own navigation route information in the driving related information on its own vehicle 100-n to the server 300 (S404), and allow the server 300 to store and manage using the look-up table (S404-1).

Meanwhile, when there is a route (the shortest time, the shortest distance, etc.) better than the navigation route of the driving related information downloaded from the server 300, the vehicle terminal may upload information including the better route in the driving related information as the recommended route to the server 300.

For example, when its own vehicle 100-n is faced with congestion while its own vehicle 100-1 is driven according to the navigation route of the leader vehicle 100-1, the vehicle terminal may search for a new route to the destination, and upload information including the retrieved new route in the driving related information as the recommended route to the server 300.

Meanwhile, when the vehicle terminal is installed in the leader vehicle 100-1, the vehicle terminal may upload information including its own navigation route information in the driving related information obtained from the sensors installed in its own vehicle 100-1 to the server 300, and simultaneously transmit the information to the vehicle terminal of the member vehicle 100-2 in which the service mode is the real-time cooperative driving mode (S302).

Accordingly, when the vehicle terminal is installed in the member vehicle 100-2 in which the service mode is the real-time cooperative driving mode, the vehicle terminal may provide the navigation service to its own vehicle 100-2 according to the driving related information received from the vehicle terminal of the leader vehicle 100-1 (S500).

For example, the vehicle terminal may provide the navigation service to its own vehicle 100-1 according to the navigation route of the driving related information received from the vehicle terminal of the leader vehicle 100-1, and provide the additional driving information including a warning condition, a traffic event, etc. included in the driving related information received from the vehicle terminal of the leader vehicle 100-1. Further, the vehicle terminal may provide the sensor information included in the downloaded driving related information in order to support a partial or complete automatic driving mode of its own vehicle 100-2.

Moreover, the vehicle terminal may monitor a driving condition of its own vehicle 100-1 according to the driving related information received from the vehicle terminal of the leader vehicle 100-1, and periodically provide the monitored driving condition of its own vehicle 100-2 to the vehicle terminal of the leader vehicle 100-1 (S501).

Meanwhile, the member vehicle 100-n in which the service mode is the navigation route navigation mode may receive the recommended route provided by the navigation service instead of the navigation route of the leader vehicle 100-1 due to the road traffic condition, and pass the leader vehicle 100-1 by being driven according to the recommended route provided by the navigation service.

Accordingly, the member vehicle 100-1 which passes the leader vehicle 100-1 may be set as a new leader vehicle, and the previous leader vehicle 100-1 may be set as a new member vehicle.

When the vehicle terminal is installed in the new leader vehicle 100-n, the vehicle terminal may obtain the driving related information on its own vehicle 100-n including the sensor information sensed by the sensors installed in its own vehicle, the additional driving information, etc. while its own vehicle 100-n is driven according to the navigation route provided by the navigation service as the vehicle terminal of the previous leader vehicle 100-1 operates.

After this, the vehicle terminal may transmit information including its own navigation route information in the obtained driving related information on its own vehicle 100-n to the new member vehicle 100-1 and the vehicle terminals of other member vehicles, and upload the transmitted information to the server 300.

According to the present invention, the route information to the destination (the navigation service) in which the member mobile object does not experience can be provided in a cooperation mode with every mobile object by sharing the route information of the leader mobile object.

Accordingly, the member mobile objects can easily follow a complex navigation route of the leader mobile object or use a better recommended route, and be provided with the navigation service without securing the visible distance with the leader mobile object.

When the member mobile object passes the leader mobile object, since the member mobile object can be set as the new leader mobile object, the new leader mobile object can continuously provide road traffic and route information to the member mobile objects.

Further, the latest information on the destination route can be previously obtained and be provided so that the member mobile objects are safely driven.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A navigation system, comprising:
a server configured to manage uploaded driving related information and navigation route information, and allow the driving related information and the navigation route information to be downloaded; and
a vehicle terminal installed in each of one leader vehicle and at least one member vehicle, when the vehicle terminal is installed in the leader vehicle, configured to upload obtained driving related information and its own navigation route information to the server and transmit the uploaded information to the at least one member vehicle, and when the vehicle terminal is installed in the at least one member vehicle, configured to provide a navigation service according to the driving related information and the navigation route information downloaded from the server by requesting the uploaded information to the server, or received from the leader vehicle,
wherein the vehicle terminal searches for a new route in response to one or more obstacles on a navigation route, and
wherein, when the vehicle terminal is installed in the leader vehicle, the vehicle terminal uploads a recommended route to the server when the recommended route having a distance or a time shorter than its own navigation route is searched for.

2. The navigation system of claim 1, wherein the driving related information includes sensor information obtained from sensors installed in each vehicle and additional driving information of each vehicle, the sensor information includes at least one among a speed, a direction, lane-changing, a vision of each vehicle, and the additional driving information includes motion information of each vehicle, and information in which a specific image or a warning display through the vision is processed as a traffic event.

3. The navigation system of claim 1, wherein, when the vehicle terminal is installed in the at least one member vehicle, the vehicle terminal downloads the driving related information and the navigation route information from the server when a service mode which is set is a navigation route navigation mode, and receives the driving related information and the navigation route information from the leader vehicle when the service mode is a real-time cooperative driving mode.

4. The navigation system of claim 3, wherein, when the service mode is the navigation route navigation mode, the vehicle terminal uploads the obtained driving related information and its own navigation route information to the server, and when a recommended route having a shorter distance or time than its own navigation route is searched for, uploads the retrieved recommended route to the server.

5. The navigation system of claim 4, wherein, when the recommended route is downloaded from the server, the vehicle terminal provides the navigation service according to the recommended route downloaded from the server.

6. The navigation system of claim 1, wherein the vehicle terminal comprises:
a wireless communication module configured to upload the driving related information and the navigation route information to the server, transmit the driving related information and the navigation route information to the at least one member vehicle, and transmit the driving related information and the navigation route information downloaded from the server or received from the leader vehicle; and
a processing module configured to transmit the obtained driving related information and its own navigation route information to the wireless communication module, or provide the navigation service according to the driving related information and the navigation route information transmitted from the wireless communication module.

7. The navigation system of claim 6, wherein, when the processing module is installed in the vehicle terminal of the leader vehicle, the processing module transmits the driving related information and its navigation route information to the wireless communication module so that the driving related information and its own navigation route information is uploaded to the server, and when a recommended route having a shorter distance or time than its own navigation route is searched for, transmits the recommended route to the wireless communication module so that the recommended route is uploaded to the server.

8. The navigation system of claim 6, wherein, when the wireless communication module is installed in the vehicle terminal of the at least one member vehicle, the wireless communication module transmits the driving related information and the navigation route information downloaded from the server to the processing module when the service mode which is set is a navigation route navigation mode, and transmits the driving related information and the navigation route information received from the leader vehicle to the processing module when the service mode in a real-time cooperative driving mode.

9. A navigation control method, comprising:
setting a cluster driving mode on its own vehicle as one of a leader driving mode and a member driving mode;
uploading driving related information and navigation route information on its own vehicle to a server when the cluster driving mode is the leader driving mode, and transmitting the driving related information and the navigation route information to a vehicle in which the cluster driving mode is the member driving mode; and
providing a navigation service to its own vehicle according to the driving related information and the navigation route information downloaded from the server by requesting the uploaded information to the server or received from a vehicle in which the cluster driving mode is the leader driving mode when the cluster driving mode is the member driving mode,
wherein a vehicle terminal searches for a new route in response to one or more obstacles on a navigation route, and
wherein the transmitting of the driving related information and navigation route information to the vehicle in which the cluster driving mode is the member driving mode comprises:
uploading a retrieved recommended route to the server when the recommended route having a shorter distance or time than its own navigation route is searched for.

10. The navigation control method of claim 9, wherein the driving related information includes sensor information obtained from sensors installed in each vehicle and additional driving information of each vehicle, the sensor information includes at least one among a speed, a direction, lane-changing, a vision of each vehicle, and the additional driving information includes motion information of each vehicle, and information in which a specific image or a warning display through the vision is processed as a traffic event.

11. The navigation control method of claim 9, wherein the providing of the navigation service to its own vehicle comprises:
    downloading the driving related information and the navigation route information from the server when a service mode which is set is a navigation route navigation mode; and
    receiving the driving related information and the navigation route information from a vehicle in which the cluster driving mode is the leader driving mode when the service mode is a real-time cooperative driving mode.

12. The navigation control method of claim 11, wherein the downloading of the driving related information and the navigation route information from the server comprises:
    uploading the driving related information and the navigation route information on its own vehicle to the server; and
    uploading a retrieved recommended route to the server when the recommended route having a shorter distance or time than its own navigation route is searched for.

13. The navigation control method of claim 12, wherein the downloading of the driving related information and the navigation route information from the server further comprises:
    providing the navigation service according to the recommended route downloaded from the server when the recommended route is downloaded from the server.

14. A vehicle terminal, wherein the vehicle terminal is installed in each of one leader vehicle and at least one member vehicle, and provides a navigation service so that each vehicle performs a navigation route cooperative cluster driving, comprising:
    a wireless communication module configured to upload driving related information and navigation route information to a server, transmit the driving related information and the navigation route information to the at least one member vehicle, or transmit the driving related information and the navigation route information downloaded from the server or received from the leader vehicle; and
    a processing module configured to transmit the driving related information and its own navigation route information to the wireless communication module, or provide the navigation service according to the driving related information and the navigation route information transmitted from the wireless communication module, and
    wherein the vehicle terminal searches for a new route in response to one or more obstacles on a navigation route, and
    wherein, when the processing module is installed in the vehicle terminal of the leader vehicle, the processing module transmits the driving related information and its own navigation route information to the wireless communication module so that the driving related information and its navigation route information is uploaded to the server, and
    when a recommended route having a shorter distance or time than its own navigation route is searched for, transmits the recommended route to the wireless communication module so that the recommended route is uploaded to the server.

15. The vehicle terminal of claim 14, wherein, when the wireless communication module is installed in the vehicle terminal of the at least one member vehicle, the wireless communication module transmits the driving related information and the navigation route information downloaded from the server to the processing module when a service mode which is set is the navigation route navigation mode, and transmits the driving related information and the navigation route information received from the leader vehicle to the processing module when the service mode in a real-time cooperative driving mode.

16. The vehicle terminal of claim 14, wherein, when the processing module is installed in the vehicle terminal of the at least one member vehicle, the processing module transmits the obtained driving related information and its own navigation route information to the wireless communication module so that the obtained driving related information and its own navigation route information is uploaded to the server, and transmits a retrieved recommended route to the wireless communication module so that the recommended route having a shorter distance or time than its own navigation route is searched for.

17. The vehicle terminal of claim 16, wherein the processing module provides the navigation service according to the recommended route when the recommended route is downloaded from the server through the wireless communication module.

* * * * *